A. C. NOAD.
GAS LAMP.
APPLICATION FILED MAY 28, 1906.

919,932.

Patented Apr. 27, 1909.

Witnesses:

Inventor
Arthur C. Noad
By James L. Norris
Atty

UNITED STATES PATENT OFFICE.

ARTHUR CUMMING NOAD, OF LONDON, ENGLAND, ASSIGNOR TO CLARK WAY HARRISON, OF LONDON, ENGLAND.

GAS-LAMP.

No. 919,932.     Specification of Letters Patent.     Patented April 27, 1909.

Application filed May 28, 1906. Serial No. 319,158.

*To all whom it may concern:*

Be it known that I, ARTHUR CUMMING NOAD, a citizen of the United States of America, residing at 29 Warwick road, Earls Court, in the county of London, England, gas expert, have invented certain new and useful Improvements in and Relating to Gas-Lamps, of which the following is a specification.

The object of my invention is to expand and heat the gas during its passage down the gas supply pipe to the burner or burners, and also to catch or trap, any products of condensation or sedimentary matter in the gas so that they can be easily removed, which otherwise would descend and clog the gas cock or fittings.

Figure 2:
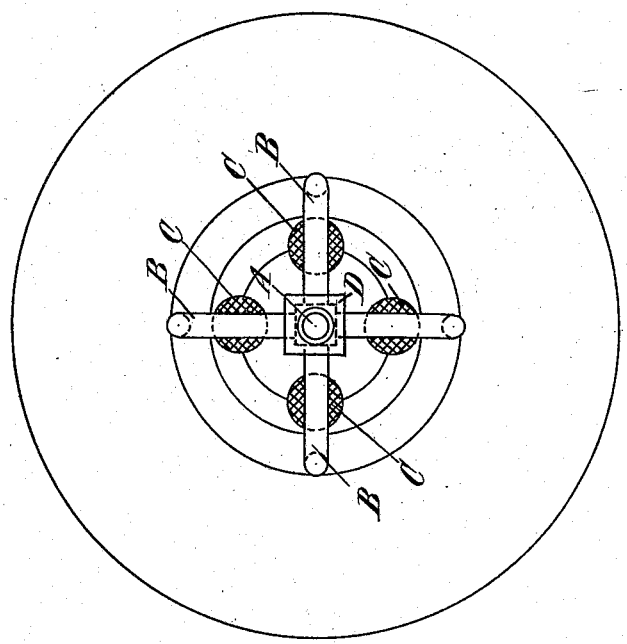
Figure 1:
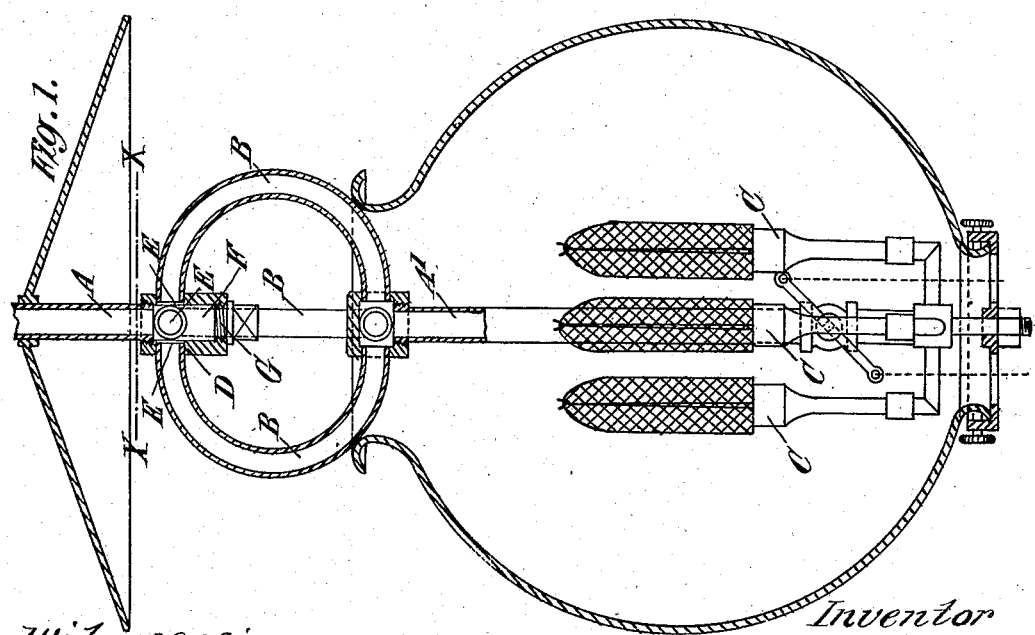

Referring to the drawings, Figure 1 is an elevation of an ordinary incandescent gas lamp showing my invention applied to it. Fig. 2 is a plan of the same on line X X.

Referring to the drawings, I make the gas supply pipe discontinuous, preferably by forming it in two parts, A and $A^1$, and I connect them by means of several tubes, B, each being preferably of a smaller diameter than the gas supply pipe A, but collectively of a larger area, so that the gas, on leaving the gas supply pipe A, and passing through the tubes B, to the lower part of the supply pipe $A^1$, is heated and expands, the tubes being arranged within the heated zone over the burners, C as shown in the drawings. I connect the tubes B to the upper gas supply pipe A, by means of a specially shaped connecting piece D which I make to project below the gas outlet E, to the tubes B, so as to form a cavity F; at the bottom of this cavity, I arrange a removable screw plug G, which can be removed to clean out any sedimentary matter or products of condensation which may lodge above it.

What I claim and desire to secure by Letters Patent of the United States is:—

1. In an incandescent gas burner, a plurality of burners, a supply pipe in communication with the burners, branch tubes leading from the supply pipe and arranged above the burners within the heated zone to heat the gas and to allow the latter to expand while being heated, and a sediment trap acting as a connecting piece to join the said branch tubes to the supply pipe.

2. In an incandescent gas lamp, a plurality of burners, a divided supply pipe made up of two lengths one of which communicates with the burners and the other with the main, branch tubes connecting the two lengths of the supply pipe and arranged above the burners within the heated zone to heat the gas and to allow the latter to expand while being heated, and a sediment trap acting as a connecting piece to join the said branch tubes to the supply pipe.

In testimony whereof I have hereunto set my hand in presence of two subscribing witnesses this 18th day of May 1906.

ARTHUR CUMMING NOAD.

Witnesses:
   FRANCIS W. BARRACLOUGH,
   T. SELBY WARDLE.